OR 3,865,464

United States Patent x 30557

Kasahara et al.

[11] 3,865,464

[45] Feb. 11, 1975

[54] FOCUSED-IMAGE HOLOGRAM MEMORY

[75] Inventors: Tadashi Kasahara; Yoshiaki Kimura, both of Tokyo, Japan

[73] Assignee: Konishiroku Photo Industry Co. Ltd., Tokyo, Japan

[22] Filed: Apr. 10, 1972

[21] Appl. No.: 242,538

[30] Foreign Application Priority Data

Apr. 10, 1971 Japan .............................. 46-22089

[52] U.S. Cl. .............................................. 350/3.5
[51] Int. Cl. .......................................... G02b 27/00
[58] Field of Search . 350/3.5; 340/173 LT, 173 LM

[56] References Cited

UNITED STATES PATENTS 3,515,452 6/1970 Pole .................................... 350/3.5
3,580,655 5/1971 Leith.................................... 350/3.5

FOREIGN PATENTS OR APPLICATIONS 1,139,121 1/1969 Great Britain ....................... 350/3.5

OTHER PUBLICATIONS

Klimenko et al., Optics & Spectroscopy, Vol. 26, No. 6, June 1969, pp. 552–555.

Van Ligten et al., Jour. of Applied Physics, Vol. 38, Mar. 1967, pp. 1994–1996.

*Primary Examiner*—Ronald J. Stern
*Attorney, Agent, or Firm*—Sughrue, Rothwell, Mion, Zinn & Macpeak

[57] ABSTRACT

A holographic process for recording and reproducing images. A plurality of information images are recorded as image holograms in coherent superposition on a recording medium. The recorded images are reproduced by illumination thereof by a slightly extended source of incoherent light. A desired one of the reproduced images is selected by controlling the position of an observation aperture.

5 Claims, 9 Drawing Figures

FOCUSED-IMAGE HOLOGRAM MEMORY

BACKGROUND OF THE INVENTION

1. Field of the Invention

This invention relates to the field of holographic recording and reproducing and, more particularly, to a method of holographically recording a plurality of images in a superposition on a recording medium and then selectively reproducing individual recorded images.

2. Description of the Prior Art

Micro-photography has been known as a method of recording, storage and retrieval of various kinds of documents and patterns, wherein the documents are usually recorded on photographic material having high resolution power in reduction ratios of 1/10 – 1/200. Recently, the method has been widely practiced with utilization of the fine recording capability of the combination of a photographic sensitive material and an optical system. In reproduction, however, it is necessary to use a high performance optical system and viewer equipment which are too bulky and heavy to carry easily. Besides, since it is difficult to obtain high resolution photographic sensitive material for color reproduction at present, microfilming of color images is generally infeasible.

Instead of the above method, there have been proposed and studied new systems in which image information is recorded on magnetic tape, photographic sensitive material or such things like that in the form of an electrical signal, and the recorded micro-images can be reproduced through television or such other electric image reproduction systems. In this method, however, it is also required to employ some large-scale equipment in reproduction.

An example of new technique analogous to microfilming is described in U.S. Pat. No. 3,425,770. In this method, recording of a plurality of different images in superposition upon a single medium may be accomplished by modulating a plurality of images with directional spatial carrier waves, and then changing the direction of a reproducing diffraction beam in accordance with the directions of the carrier wave. Though the method has an advantage that high reduction ratio is not required because of its superimposed recording of images, it has the disadvantage that the system is complicated, and it is impossible to record very many information images upon a single medium because many diffraction beams must be selected for reproduction.

SUMMARY OF THE INVENTION

It is, therefore, the first object of the present invention to record a great number of images upon a recording medium by way of coherent superposition recording which utilizes the holographic technique.

It is the second object of the present invention to provide for the recording of vast quantities of information images in a given area without high enlargement ratio in reproduction by utilization of the superposition recording of images.

It is the third object of the present invention to simplify the reproducing optical system because of the small enlargement ratio in reproduction of the image information recorded on the medium.

It is the fourth object of the present invention to display a number of recorded information images in a small area with very simple reproducing apparatus.

It is the fifth object of the present invention to record a great number of images and to reproduce selectively and arbitrarily with utilization of coherent superposition recording together with incoherent superposition recording on a medium.

It is the sixth object of the present invention to record and reproduce color images upon an easily obtainable recording medium such as, for example, monochromatic photographic sensitive material.

It is the seventh object of the present invention to retrieve with a very simple system the information images recorded in superposition on a medium.

It is the eighth object of the present invention to easily duplicate the superposed recording of images in large quantities.

In accordance with the present invention, the above mentioned objects are accomplished in a process in which a plurality of information images are recorded as image holograms in a coherent superposition recording, the plurality of recorded images are reproduced by the illumination thereof by a slightly extended source of incoherent light, and the desired information is retrieved from this plurality of images by selecting the position of an observation aperture.

The present invention may be summarized as a method of holographic recording and reproduction of a plurality of information images wherein a plurality of information micro-images are disposed behind a plurality of optical apertures which are spatially adjacent each other, real images of the information images are focused in superposition through the optical apertures upon a photosensitive recording material in front of the optical apertures by illuminating the information images with a coherent light source from the rear side thereof, the photosensitive material is illuminated simultaneously with a reference beam having coherent relation with the illuminating light. Furthermore, the invention comprises the method of reproducing a plurality of recorded information images wherein the photosensitive recording material on which a plurality of information images are recorded in superposition is illuminated by a slightly extended source of incoherent light, and a certain desired information image is obtained through an observation aperture in a specific position corresponding to one optical aperture of a plurality of optical apertures. Thus, the present invention provides various advantages which cannot be obtained with prior art information recording systems such as, for example, microfilming.

Other objects, features and advantages of the present invention will become apparent upon reading the following detailed description of a preferred and other embodiments of the invention and referring to the accompanying drawing.

DESCRIPTION OF THE PREFERRED EMBODIMENTS

Figure 1:
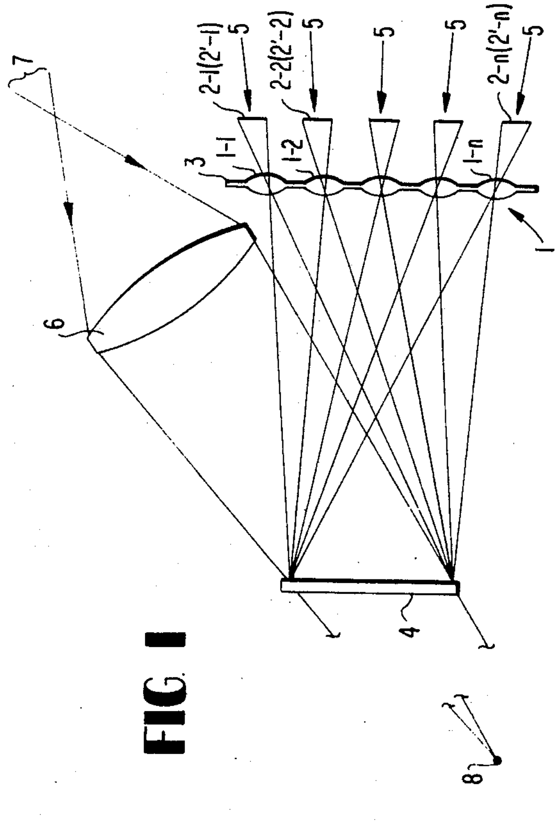
FIG. 1 is a schematic diagram of a basic arrangement of a recording system in accordance with the present invention.

Referring to FIG. 1, there is illustrated the principle of a super-position recording process of the present invention. Reference numerals 1-1, 1-2, . . . and **1-*n* denote, respectively, optical lens systems which project information micro-images represented by reference numerals 2-1 . . . and 2-*n* as real images on the surface of sensitive material 4 for hologram recording. Between the micro-images and the hologram recording material 4 is provided a shadow mask 3 having apertures corresponding to the lens system and through which the respective micro-images are directed separately, i.e. one at a time, to the surface of the hologram recording material 4**. Though photographic sensitive material having high resolving power is usually utilized as the sensitive material for hologram recording, there is no special limitation about the character of the sensitive material in this invention.

Numeral 5 denotes a coherent beam to illuminate the micro-images, and a laser beam is usually used as the illuminating light source. In hologram recording, it is also required to illuminate the recording medium 4 with a reference beam. This may be accomplished by dividing the laser beam which supplies the illuminating light 5 and using one portion of the laser beam as an illumination 7 through a lens 6. The lens 6 is provided so as to focus the reference beam to a point 8, and utilization of a convergent reference beam is effective to simplify the reproducing system, as will be described hereinafter. It is, however, not necessarily required to use the lens 6 for the practice of the information recording and reproducing process of the present invention.

Figure 2:
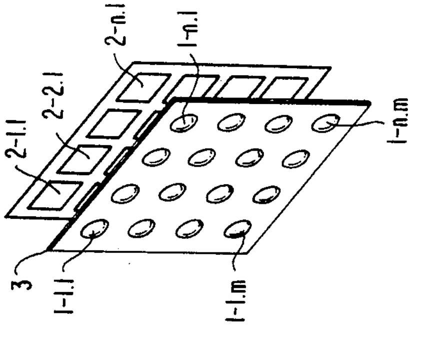
FIG. 2 is a perspective view of an arrangement of the optical apertures and a plurality of information images of FIG. 1.

Although only *n* images are illustrated in FIG. 1 for convenience in describing the principle of the invention, it is possible, as shown in FIG. 2, to dispose the optical apertures 1 and the micro-images 2, such as black and white transparencies, in a two-dimensional arrangement so that the $n \times m$ images can be recorded simultaneously on the sensitive material 4 as a hologram. In FIG. 1 and FIG. 2, a number of optical apertures and micro-images are disposed in single planes. However, if desired, they may be arranged in different planes on the condition that their optical paths do not interfere with each other. The hologram recording material may also be in arbitrary shapes other than a plane.

With the arrangement as shown in FIG. 1, a great number of images may be stored on a sensitive material in coherent superposition recording. In the case of FIG. 2, the number of images is $n \times m$; therefore, the smaller the optical aperture can be made, the greater the value of $n \times m$ becomes. Theoretically, if the size of the respective optical apertures is more than 3 mm, sufficient clearness of the recorded images may be maintained. Accordingly, when a large value of $n \times m$ is required, the size of respective micro-images must be considerably small, and thus, microfilm is one of the suitable sources of images. At the same time, each of the optical systems 1 must have sufficient sharpness.

Figure 3:
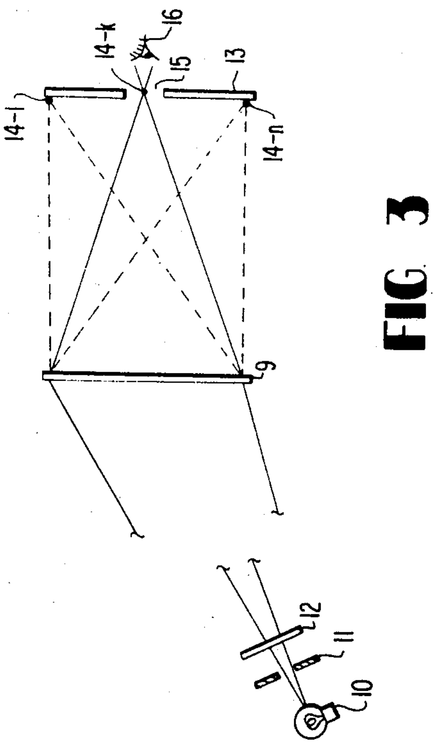
FIG. 3 is a diagrammatic view illustrating the reproduction process in accordance with the present invention.

Referring now to FIG. 3, there is illustrated a reproducing system for the information recorded in superposition by the method described above, wherein the hologram sensitive material 9 having the images recorded in superposition is disposed in a position to receive illumination from a lamp 10, and through a stop 11, having a suitable value, and a monochromatic filter 12. The light beam from the light source 10 passes through the stop 11 and the filter 12 to illuminate the hologram 9 and reproduce a plurality of images on the surface thereof.

When the position of the light source is selected to be at the point corresponding to the position 8 in FIG. 1, real images of the apertures are formed by the imaging function of hologram at the positions corresponding to the optical apertures 1-1 . . . and **1-*n*, respective positions of which are illustrated in FIG. 3 as 14-1, 14-*k* . . . and 14-*n*. Reference numeral 13 denotes an opaque plate having an aperture 15. When the hologram is observed through the aperture 15 which is disposed in a position coincident with that of position 14-*k*, the image information corresponding to optical aperture 1-*k* can be selectively observed. If a laser beam is employed instead of the lamp 10 as the light source for reproduction, the images may be reproduced without any crosstalk. However, this will cause the reproduction system to be considerably complicated, and image quality will be deteriorated by so called speckle noise. Though it may be possible to make a very inexpensive reproduction system without the speckle noise by utilizing a tungsten lamp, crosstalk between reproduced images will be caused by the widening of wavelength spectrum width and the larger size of the light source. Accordingly, it is desirable to employ the stop 11 to limit the size of the light source and the monochromatic light filter 12**.

In FIG. 3, an optical system, such as condenser, is not used between the illuminating light source 10 and the hologram 9 due to the fact that the reference beam in the recording process in FIG. 1 is a convergent beam. That is, since the lamp 10 is positioned at the point corresponding to the convergence point 8 in FIG. 1, easy reproduction of the images may be attained by illuminating the hologram 9 with a divergent beam from the point source of light 10. When the reference beam in FIG. 1 is divergent or collimated, it is required to converge the reproducing beam with a condenser lens or to use a collimated beam.

By moving the opaque plate 13 within one plane to shift the position of the aperture 15 relatively to the hologram 9, sequential selective observation of the images recorded in superposition may be made thereby resulting in easy retrieval of the $m \times n$ information images.

Figure 4:
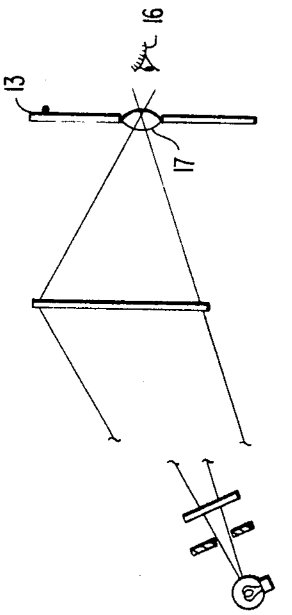
FIG. 4 is a diagrammatic view illustrating the employment of a simple optical system having low magnification ratio in the reproduction process.

Though the distance between the hologram 9 and the optical aperture 15 must be maintained approximately in the range of clear vision in FIG. 3, reduction of the projection distance of the optical system in the superposition recording process in FIG. 1 will make it possible to record vast quantities of information images in a small area of the sensitive material 4. As shown in FIG. 4, the images are reproduced in such a case by attaching a simple auxiliary lens 17 which has low magnification ratio to the optical aperture to reduce the distance between the hologram and the observation aperture in accordance with the recording process.

Figure 5:
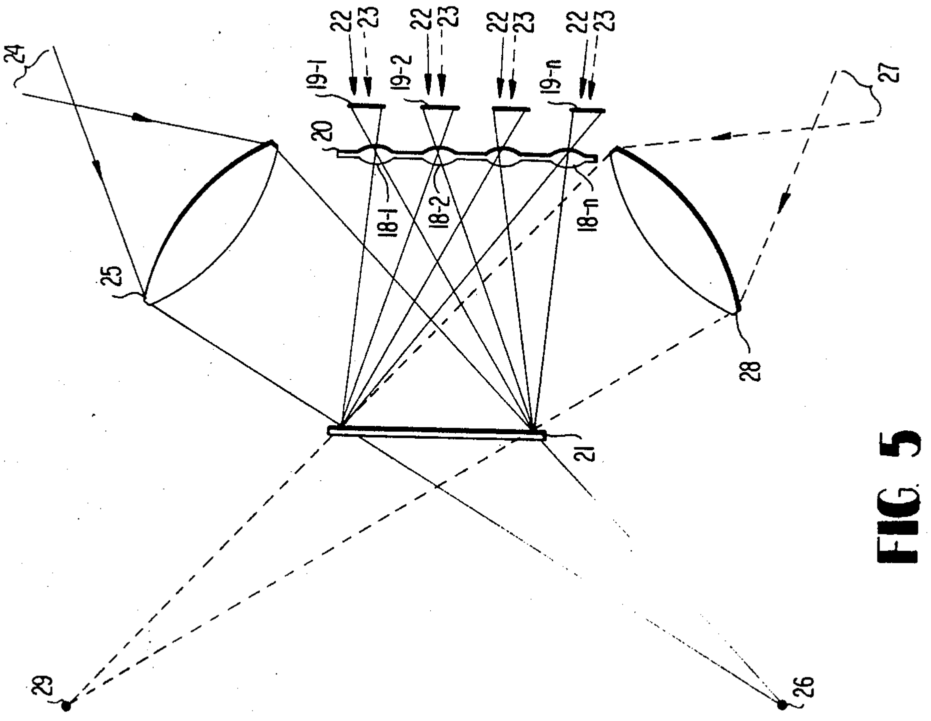
FIG. 5 is a diagrammatic view illustrating the principle of superposition recording of a plurality of color images in accordance with the present invention.

Referring to FIG. 5, there is illustrated a process for the recording of color images in superposition. As in the case of FIG. 1, a plurality of apertures 18-1 . . . , 18-*n* including optical systems, a number of information images 19-1 . . . , 19-*n* to be recorded, and a sensitive material 20 for hologram recording are arranged, respectively as illustrated. The images to be recorded comprise positive color transparencies. Reference numerals 22 and 23 denote coherent beams having different wavelengths for illuminating the images. Though only two different wavelengths are illustrated in FIG. 5, more than three different wavelengths are usually utilized in practice. Numeral 24 denotes a reference beam having coherent relation with the illuminating light 22 and which is focused to a point 26 through a lens 25 to illuminate the hologram 21. Numeral 27 indicates another reference beam having coherent relation with the illuminating light beam 23 and which is focused to a point 29 through another lens 28 to illuminate the hologram. Since the reference beams must be same as the coherent light to illuminate the images, more than three different wavelengths of beams should usually be projected from different directions. However, only two different wavelength reference beams are illustrated in FIG. 5 for the convenience of explanation.

Figure 6:
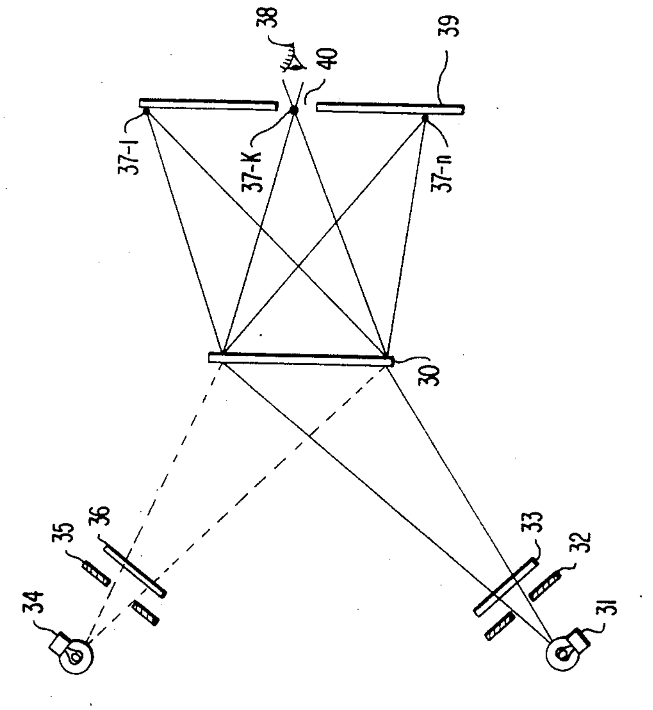
FIG. 6 is a diagrammatic view of a reproduction system for color images recorded in superposition.

In FIG. 6, there is illustrated a reproducing and observing system of the image information recorded in the process shown in FIG. 5. The system includes a developed and fixed hologram 30 and an opaque plate 39 having an observation aperture 40. The illuminating system for reproduction is composed of two lamps 31 and 34, two stops 32 and 35 having suitable value, and two wavelength selective filters 33 and 36. The wavelength selective filters 33 and 36 have their transparent band corresponding respectively to the wavelength of the coherent light beams 24 and 27 of FIG. 5. Only two different wavelengths are illustrated in FIG. 6. Nevertheless, more than three different wavelengths are usually used in practice as in the recording process. By placing the observer's eyes at the back of the aperture 40 to view the hologram 30 in FIG. 6, a color image the same as that projected onto the hologram surface through the optical aperture 18-*k* in the recording process in FIG. 5 is observed.

In the description in conjunction with FIG. 5, positive color transparencies are used as the information image 19. However, it is possible to employ three or more monochromatic images decomposed into their component colors as images. In the recording process in such a case, the images are changed sequentially and exposures must be made more than three times with a change of the wavelength of the coherent beam for each exposure. As a result, a coherent superposition recording may be accomplished among the respective micro-images forming a monochromatic image by exposure to only one wavelength, while an incoherent superposition recording may be made by exposure to a plurality of different wavelengths.

As is mentioned above, in accordance with the present invention, color images can be recorded by utilizing holographic techniques in coherent superposition recording together with incoherent superposition recording. This technical conception may be expanded to increase the quantity of information images to be recorded in superposition. Such a superposition recording can be accomplished in the process by using the arrangement shown in FIG. 1. At first, as previously mentioned in connection with FIG. 1, the first coherent superposition recording of $n \times m$ images is made. Next, the recorded images 2-1, . . . , 2-*n* are exchanged for a different $n \times m$ image 2'-1 . . . , 2'-*n* to be recorded, and at the same time, the sensitive material 4 for hologram recording is rotated through a certain angle, for example 90°, in the plane including the sensitive material 4. After that, the second coherent superposition recording is made by illumination with the coherent beams 5 and 7. Generally, incoherent superposition recording in the hologram tends to increase the noise level in the reproduced image. However, according to the results of experiments, the effects of superposition recording of 2 to 5 times on the reproduced image are negligible. Therefore, $l$ incoherent superposition recordings enable the storage of $n \times m \times l$ images on the hologram recording material, thereby resulting in a considerable increase of recording density.

When the images recorded in incoherent superposition according to this invention are reproduced, the arrangements shown in FIG. 3 or FIG. 4 may be utilized, wherein the images can be observed by rotating the hologram 9 through a certain angle in the plane including it as required. It is needless to say that this method is applicable to the recording and reproduction of color images as shown in FIGS. 5 through 9.

Figure 7:
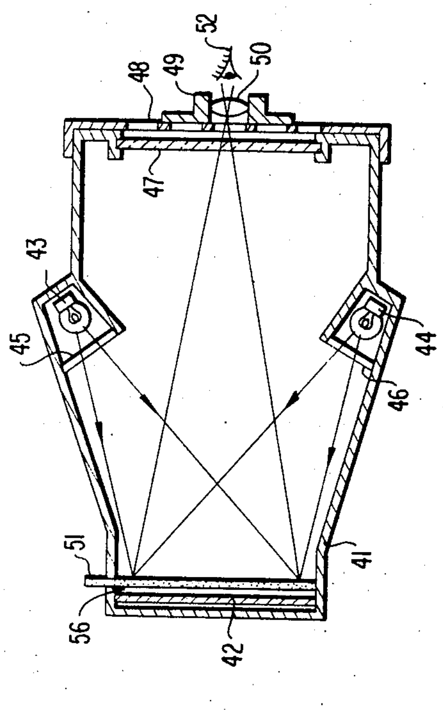
FIG. 7 is a cross-sectional view of an embodiment of the apparatus utilized for the reproduction process.
Figure 8:
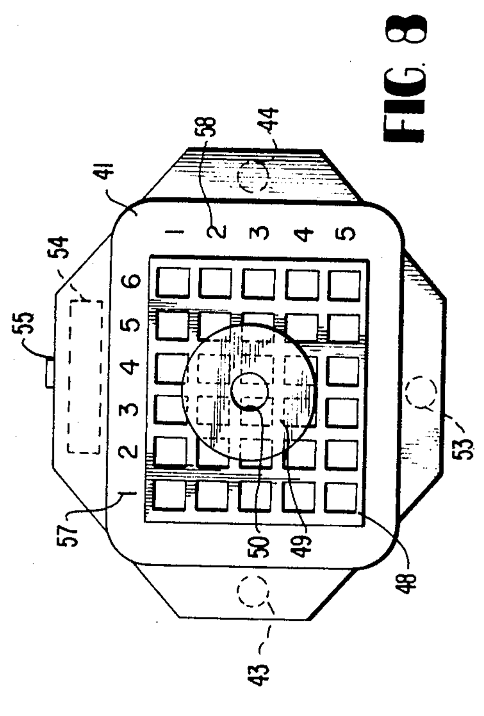
FIG. 8 is a front view of the apparatus of FIG. 7.

Referring now to FIG. 7 and FIG. 8, there is illustrated an observation system for the color images recorded in superposition according to this invention. FIG. 7 is a cross-sectional view of the observation system, and FIG. 8 is a front view of the observation aperture side.

In FIGS. 7 and 8, reference numeral 41 denotes a housing, numeral 42 indicates a surface reflecting mirror, and numerals 43, 44 and 53 denote lamps to emit light having three different wavelengths for color reproduction. Reference numerals 45 and 46 denote color selective filters, respectively, for red and green. For perfect full-color reproduction, a blue filter should be applied to the light source 53, but it is not shown in the drawing. Numeral 57 denotes a dust-proof glass to which an iron grating 48 is secured. Reference numerals 49 and 50 indicate, respectively, an eye-piece frame of magnetic material and a magnifier having a low magnification ratio and which may be attached to an arbitrary position on the grating 48 by its magnetic attraction. Numerals 54 and 55 denote, respectively, a battery for supplying electric power to the lamps, and an electric switch. When the sensitive material 51 on which a plurality of images are recorded in superposition by the method of FIG. 5 is inserted into a slit 56 and the three lamps 43, 44 and 53 are turned on, any one of the color images recorded in superposition can be selectively observed through the eye-piece 50 mounted in an arbitrary position on the grating 48. It is convenient to utilize retrieval numbers 57 and 58, which are inscribed at the side portions of the grating, when a required image is to be selected from a large number of recorded images.

From the foregoing description of the embodiments in accordance with the present invention, it is apparent that the observation system of the invention can be constructed with very simple synthetic resin material, simple metal parts and inexpensive optical systems. Besides, since the images recorded in superposition in an area approximately 10 centimeter square can be readily magnified 2 or 3 times for observation by using a magnifier having a low magnification ratio, a large quantity of information images corresponding to the documents of several tens or several hundreds of pages may be arbitrarily retrieved and observed even with the simple observation system such as described above. Furthermore, since the recording medium used in this invention is preferably a high resolution monochromatic photographic sensitive material, it is cheaply obtainable.

Duplication of the images recorded in superposition may be readily accomplished with the application of a duplicating technique to the hologram with the result that it is possible very inexpensively to provide information corresponding to documents of several hundreds of pages printed in color.

Figure 9:
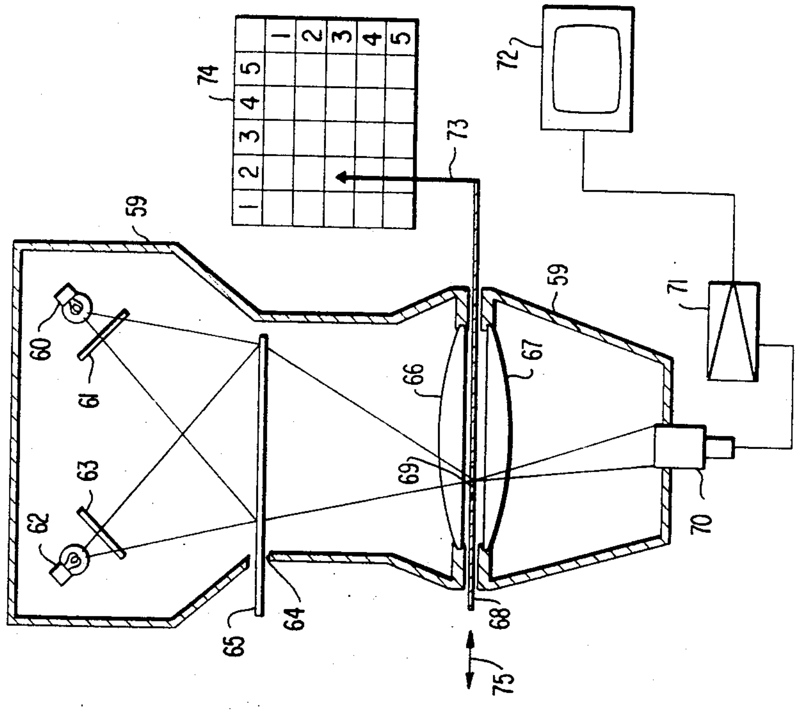
FIG. 9 is a diagrammatic view of another embodiment of the apparatus utilized for the reproduction process in accordance with the present invention.

The embodiments of the observation system described above is useful for only one person. FIG. 9 shows an exemplary embodiment of an observation system which may be used by a plurality of persons at the same time. Reference numeral 59 denotes a housing and numerals 60 and 62 denote illuminating lamps. Numerals 61 and 63 denote color selective filters. Though it is not shown in the Figures, the lamps and the filters usually include at least three of each, for example, for the colors red, green and blue. Numeral 64 denotes a slit through which the hologram recording material 65 having superposed images recorded thereon according to the method of the present invention may be inserted into a predetermined position.

Reference numerals 66 and 67 are lens system directing the reproduced images onto the focusing plane of an image pickup tube 70 in a television system. The dimension of the aperture portion of the lens system should have a capability of covering all the real images reproduced from the hologram at all the recording apertures. Numeral 68 denotes an opaque plate for image selection including an aperture 69 having a size corresponding to that of the real image at one recording aperture. The opaque plate is two-dimensionally movable arbitrarily in the plane perpendicular to the axis of the observation system as shown by the arrow 75. A pointer 73 is secured to one end of the opaque plate which cooperates with a scale plate 74 attached to the housing 59 to permit retrieval of a required image. Numeral 70 denotes an image pickup tube for the television system. Numerals 71 and 72 denote a video amplifier and a television display device, respectively, and they may be any suitable color television system. The hologram 65 and the television image pickup tube are optically conjugate with respect to the lenses 66 and 67. Therefore, all of the information images recorded in superposition may be developed on the image pickup tube overlapping at the same position. In order to select a single image, one merely sets the aperture 69 of the opaque plate 68 to the required position, thereby resulting in easy retrieval of the desired information.

While the invention has been particularly shown and described with reference to preferred embodiments thereof, it will be understood by those skilled in the art that various changes in form and details may be made therein without departing from the spirit and scope of the invention.

We claim:

1. A method of recording and reproducing images wherein a plurality of different, unrelated images are recorded in superposition as a hologram comprising the steps of:

a. providing a plurality of different, unrelated micro-images and a corresponding plurality of optical lenses which are disposed spatially adjacent each other within apertures in a mask;
b. illuminating said images with a coherent light beam to focus real images in superposition through said optical lenses onto a photosensitive recording material disposed at the image forming position of said optical lenses, each image being recorded on the same area of the recording medium;
c. illuminating, simultaneously with the above illuminating step, the photosensitive recording material with a reference light beam having a coherent relationship with said light beam and focused at a point at a finite distance from the side of said recording material opposite to the side on which the images are focused, thereby recording superposed image holograms on said recording material;
d. reproducing the recorded images by illuminating said photosensitive recording material with a slightly extended source of incoherent light positioned at said point; and
e. positioning a mask containing an observation aperture so that the aperture is located in a selected position corresponding to a selected one of said plurality of lenses to permit observation of a corresponding selected one of the reproduced images.

2. A method of recording and reproducing images as claimed in claim 1, wherein said illuminating step of paragraph (b) further comprises illuminating said images with a coherent light beam having a plurality of different wavelengths; and wherein the illuminating step of paragraph (c) further comprises simultaneously illuminating the recording material with a reference light beam having a coherent relation to, and the same wavelengths as, said coherent light beam and each reference wavelength being focused to a corresponding point on said opposite side of said recording material; and wherein the reproducing step of paragraph (d) comprises illuminating said recording material with said different wavelengths from a plurality of slightly extended sources of incoherent light, each extended source being positioned at the focus point of the corresponding wavelength of the reference beam.

3. A method of recording and reproducing images as claimed in claim 1 further comprising replacing said micro-images with different images, rotating said recording material through a predetermined angle, and repeating the steps of paragraphs (b), (c), (d), and (e).

4. A method of recording and reproducing images as claimed in claim 1, wherein said plurality of images includes set of a plurality of monochromatic images, each of said sets corresponding to a color of a different one of component colors of color images, and further comprising illuminating successively each image of each set with a coherent light beam corresponding respectively to said each set by changing said each image of each set together with changing the illuminating direction and wavelength of said coherent light beam, and reproducing the color images by illuminating said recording material with a slightly extended source of a plurality of incoherent lights including all of said component colors.

5. An apparatus for the recording and reproducing of images wherein a plurality of different, unrelated images are recorded in superposition as a hologram comprising:

a. a plurality of spatially adjacent optical lenses disposed in apertures in a mask, b. a plurality of different, unrelated images disposed on one side of said optical lenses, c. a photosensitive recording material disposed on the opposite side of said optical lenses at the image forming position thereof d. means for illuminating said images with a first coherent light beam to focus real images through said lenses in superposition on the same area of said material, e. means for simultaneously illuminating said material with a reference light beam coherent with said first light beam to record an image hologram on said recording material, f. lens means for focusing said reference beam to a point at a finite distance from the side of said recording material opposite the side thereof on which the images are focused, g. image reproducing means comprising a slightly extended source of incoherent light for illuminating said recording material to reproduce the recorded images in an image plane, said source being located at said point, and h. a mask displaceable in said image plane and having an observation aperture for selectively observing individual ones of the reproduced images in accordance with the correspondence between the position of said observation aperture and individual ones of said optical lenses.

* * * * *